United States Patent [19]

Church et al.

[11] 4,219,854

[45] Aug. 26, 1980

[54] THIN FILM MAGNETIC HEAD ASSEMBLY

[75] Inventors: Mark A. Church, Los Gatos; Robert E. Jones, Jr., San Jose, both of Calif.

[73] Assignee: International Business Machines Corporation, Armonk, N.Y.

[21] Appl. No.: 972,103

[22] Filed: Dec. 21, 1978

[51] Int. Cl.² .................. G11B 5/20; G11B 5/22; G11B 5/60

[52] U.S. Cl. .................. 360/123; 360/119; 360/125; 360/103

[58] Field of Search .................. 360/122–123, 360/119–120, 102–103, 125–127; 336/200, 205, 208, 225, 229, 230

[56] References Cited

U.S. PATENT DOCUMENTS

| | | | |
|---|---|---|---|
| Re. 29,326 | 7/1977 | Lazzari et al. | 360/123 |
| 3,564,522 | 12/1966 | Stevens, Jr. | 360/123 |
| 3,685,144 | 8/1972 | Trimble | 360/123 |
| 3,766,640 | 10/1973 | Hahn, Jr. | 29/603 |
| 3,829,896 | 8/1974 | Brock et al. | 360/123 |
| 3,846,842 | 11/1974 | Lazzari | 360/126 |
| 3,891,995 | 6/1975 | Hanazono et al. | 360/123 |
| 4,016,519 | 4/1977 | Haas | 336/200 |
| 4,130,847 | 12/1978 | Head et al. | 360/103 |
| 4,149,205 | 4/1979 | Berghof et al. | 360/126 |

*Primary Examiner*—Alfred H. Eddleman
*Attorney, Agent, or Firm*—Nathan N. Kallman

[57] ABSTRACT

A thin film magnetic head assembly has a multi-turn electrical conducting coil, which is formed by deposition in an elliptical pattern. By virtue of the elliptical pattern, the coil turn portions between the back gap closure and transducing gap of the thin film head are relatively narrow, whereas the coil turn portions furthest from the transducing gap are widest. Corners and sharp ends are eliminated. Electrical resistance effects are thereby minimized and signal output is enhanced.

5 Claims, 2 Drawing Figures

THIN FILM MAGNETIC HEAD ASSEMBLY

DESCRIPTION

Technical Field

This invention relates to a novel and improved structure for a thin film magnetic head assembly.

An object of this invention is to provide a thin film magnetic head assembly which realizes an improved signal output.

Another object of this invention is to provide a thin film magnetic head assembly having relatively low and uniform heat generation and dissipation.

Another object is to provide a thin film magnetic head assembly which has minimal thermal and stress effects with resultant longer life.

BACKGROUND ART

One of the major problems found with the use of thin film magnetic transducers is the generation of heat which is not dissipated readily and which accumulates nonuniformly over the volume of the transducer. Excessive heat may cause delamination of the layered structure or stretching of the parts, or dilation with resultant pole tip protrusion.

When forming the thin film magnetic transducer, the back gap closure which is formed by the magnetic pole pieces should be as close to the effective transducing gap as possible to minimize signal loss that occurs with longer magnetic circuit paths. In addition, the electrical conducting coil, which is magnetically coupled to the pole pieces and carries the current generating the magnetic flux appearing at the transducing gap, should have as many turns as possible to enable increased signal amplitude.

Thus, it would be desirable to have a thin film transducer formed with a conducting coil of several turns, with the coil being of low resistance and generating a minimal amount of heat, yet having the coil portion between the back gap closure and transducing gap contained in a relatively small area.

BRIEF DESCRIPTION OF THE DRAWINGS

The invention will be described in detail with reference to the drawing in which.

Figures 1, 2:
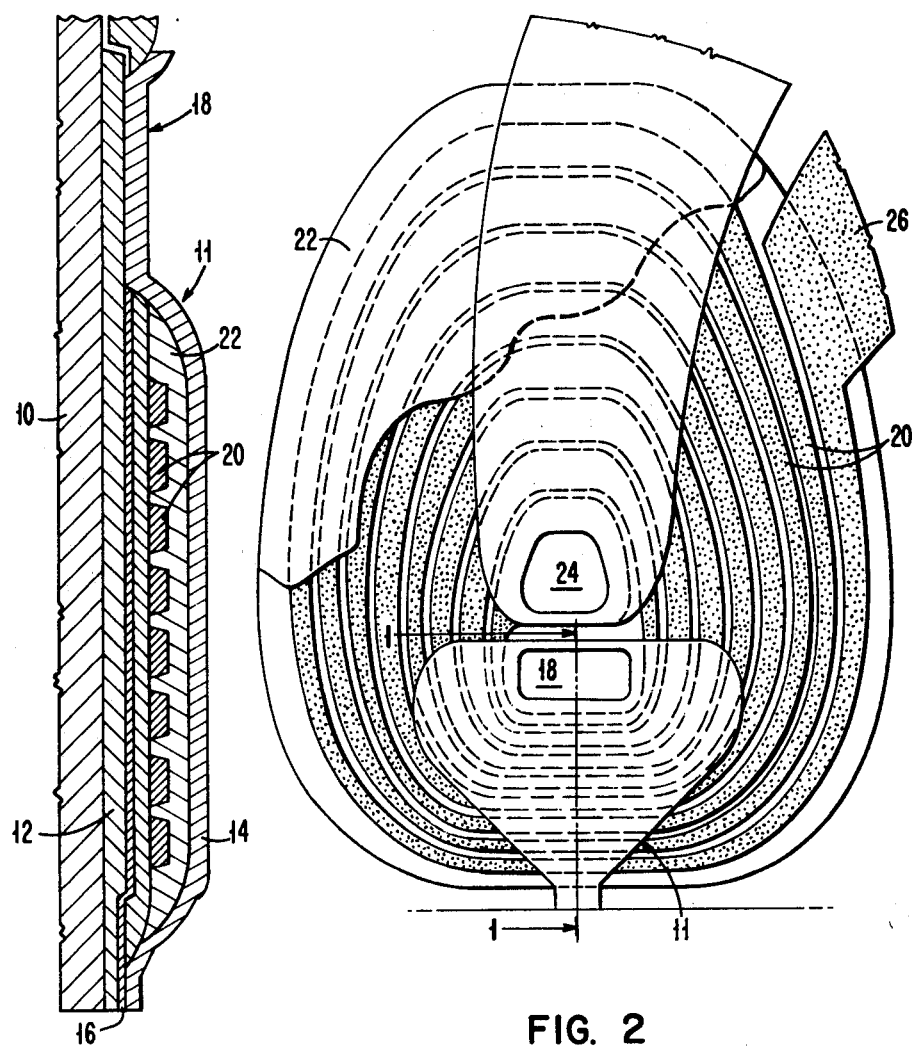
FIG. 1 is a sectional view of a thin film magnetic head assembly, including an electrically conducting coil, in accordance with this invention.
FIG. 2 is an enlarged plan view of the conducting coil employed in an embodiment of this invention.

It should be noted that FIG. 2 is not in dimensional proportion to the assembly illustrated in FIG. 2.

With reference to the drawing, a thin film head assembly 11 comprises a nonmagnetic ceramic support 10 on which are deposited magnetic pole piece layers 12 and 14, made from Permalloy, by way of example. A nonmagnetic insulating material 22 is deposited between the pole piece layers 12 and 14. A portion of the insulating material defines a transducing gap 16, which interacts in transducing relation with a magnetic medium, preferably in an air bearing relation, as is well known in the art. For this purpose, the support 10 is formed as a slider with an air bearing surface (ABS) that flies closely adjacent to the record medium, which may be a rotating magnetic disk, during operation of a disk file.

The thin film head structure has a back gap portion 18 formed by the closure of the pole pieces 12 and 14. The back gap closure 18 is spaced from the transducing gap, with a coil structure 20 interposed between the back gap and the transducing gap.

The continuous coil 20 is deposited in a layer by plating, for example, onto the first pole piece 12 and is located between and coupled magnetically to the separated pole piece layers 12 and 14. The coil 20 and the pole pieces 12 and 14 are separated by the insulator 22, which embodies the portions of the coil between the pole pieces. The center area of the coil provides an electrical contact 24, and similarly, the outermost termination of the coil has an enlarged area for an electrical contact 26. The contacts are connected to external wiring and head circuitry (not shown) for processing write and read data signals.

In keeping with this invention, the single layer coil 20 is formed in an elliptical configuration with smaller cross-sectional areas closest to the transducing gap, with progressively larger cross-sectional areas as the distance from the gap increases.

The back gap closure 18 is located relatively close to the air bearing surface of the transducing gap. Nevertheless, a relatively large number of coil turn portions are positioned in the area between the back gap and the transducing gap, because the widths or the cross-section diameters of the elliptical coil are relatively narrow in that area. As a result of the large number of turns an increase in signal output is realized. Furthermore, the larger cross-section diameters at the area furthest from the transducing gap provides a reduced electrical resistance. In addition, since the elliptical turns have no corners or sharp ends, there is less resistance to current flow. Also, the elliptical pattern affords a reduced total length of the conductive coil, as compared to rectangular or circular type coils. As a result of these features, the total resistance of the coil is relatively low and there is less heat generation and optimum heat dissipation. The significant reduction in heat prevents delamination, stretch and dilation of the thin film layers, and eliminates a cause of pole tip protrusion at the air bearing surface.

The elliptical coil configuration, which has a uniform progression of varying width, may be deposited by well known plating techniques, which are less expensive than sputtering or evaporation processes. Plating of coils in other geometries tends to build structures with nonuniform widths, particularly if corners are included in the geometry. The elimination of corners and sharp ends realizes less mechanical stress for the fabricated coil.

There has been disclosed herein a thin film head assembly incorporating a multiturn, continuous electrical coil layer plated between magnetic pole pieces, and formed in an elliptical configuration. The cross-sectional diameter of the coil progressively increases from the area of the transducing gap towards the area at and beyond the back gap closure. As a result, an increase in signal output is realized and electrical resistance and heat generation is substantially reduced.

What is claimed is:

1. A thin film magnetic head assembly comprising:
   a nonmagnetic substrate having at least one formed surface;
   first and second magnetic pole piece layers deposited on said substrate;

a nonmagnetic insulating material disposed between said pole piece layers, said material forming a transducing gap located adjacent to said formed surface;

said pole pieces being connected to form a back gap closure; and an electrically conductive coil having a plurality of turns located between said back gap closure and said transducing gap, said coil being formed in a single planar layer and in an elliptical pattern.

2. A thin film magnetic head assembly as in claim 1, wherein said coil is formed in a continuous path, and including electrical contacts connected to said coil at each end of said path.

3. A thin film magnetic head assembly as in claim 1, wherein the diameter of said turns of said elliptical coil closest to said transducing gap is smallest, and progressively increases as the distance from said transducing gap increases.

4. A thin film magnetic head assembly as in claim 1, wherein said formed surface is an air bearing surface.

5. A thin film magnetic head assembly as in claim 1, wherein the density of said turns adjacent to said transducing gap is greatest and progressively decreases as the distance from said gap increases.

* * * * *